United States Patent [19]
Newcomb

[11] Patent Number: 5,199,212
[45] Date of Patent: Apr. 6, 1993

[54] SOIL DECONTAMINATION SYSTEM
[75] Inventor: Bobby G. Newcomb, Oklahoma City, Okla.
[73] Assignee: ARC Management, Co., Oklahoma City, Okla.
[21] Appl. No.: 682,789
[22] Filed: Apr. 8, 1991
[51] Int. Cl.⁵ ...................... A01B 77/00; A01G 11/00
[52] U.S. Cl. ...................... 47/1.42; 110/240; 110/241; 110/222
[58] Field of Search ............. 432/59, 8, 7; 47/1.42; 110/221, 236, 224, 248, 222, 240, 241

[56] References Cited
U.S. PATENT DOCUMENTS

| | | | |
|---|---|---|---|
| 3,693,951 | 9/1972 | Lawhon et al. | 263/8 R |
| 3,938,450 | 2/1976 | Jaronko et al. | 110/241 |
| 4,561,860 | 12/1985 | Gulley et al. | 110/224 |
| 4,592,515 | 6/1986 | Hays | 241/69 |
| 4,667,609 | 5/1987 | Hardison et al. | 110/236 |
| 4,702,178 | 10/1987 | Welsh | 110/193 |
| 4,748,921 | 6/1988 | Mendenhall | 110/346 |
| 4,750,437 | 6/1988 | Rouse | 110/222 |
| 4,784,603 | 11/1988 | Robak, Jr. et al. | 119/222 |
| 4,787,323 | 11/1988 | Beer et al. | 110/346 |
| 4,815,397 | 3/1989 | Minnie, Jr. | 110/223 |
| 5,020,452 | 6/1991 | Rybak | 110/241 |
| 5,027,721 | 7/1991 | Anderson | 110/240 |

OTHER PUBLICATIONS

Ohio Central Steel Co., The Screen Machine (no date).
Dirty Soil Disposal: How the Options Compare, U.S. Oil Week (Feb. 26, 1990).
Thermal Treatment for Soils, Underground Technology Update (Jun. 1990).
VR Systems Inc., State-of-the-Art Soil Remediation System (1989).
VR Systems Inc., Operating Instructions for BACT1 Model V3 Vapor.
Ohio Central Steel Co., Service Manual (no date).
Catalytic Industrial Systems, Flameless Catalytic Gas Fired Infra.
24 photographs taken in 1990.

Primary Examiner—Henry C. Yuen
Attorney, Agent, or Firm—Dunlap, Codding & Lee

[57] ABSTRACT

A method and apparatus for the removal of contaminants from soil. The soil is pulverized, and then heated to volatilize the contaminants. The volatilized contaminants are then burned as fuel in an internal combustion engine.

24 Claims, 4 Drawing Sheets

SOIL DECONTAMINATION SYSTEM

FIELD OF THE INVENTION

The present invention generally relates to an improved method and apparatus for thermal soil decontamination. More particularly, but not by way of limitation, the present invention relates to a thermal soil decontamination system in which the contaminated soil is heated by infra-red radiation to volatilize the contaminants. The volatilized contaminants are separated from the soil and then used as fuel in an internal combustion engine.

SUMMARY OF THE INVENTION

The use of organic chemicals has been prevalent throughout the world for many years and this use has created many environmental problems. One of the serious problems associated with the use of organic chemicals is the contamination of soil. The rising ecological conscience of the world in conjunction with new laws on pollution have given rise to a need for a quick inexpensive way to remove contaminants from soil.

One way to decontaminate soil is to aerate the contaminated soil. Aeration is accomplished by spreading the contaminated soil out on an impermeable barrier such as a heavy plastic sheet and then raking it around until the contaminants evaporate. However, this method may require a great deal of time and is objectionable because it causes air pollution.

Some other methods of decontamination include rotary kilning, vapor extraction and bioremediation. While these methods may adequately remove the contaminants from the soil, they are either expensive or require a great deal of time.

Rotary kilning uses a kiln to burn the contaminants out of the soil. This method is a relatively quick way to decontaminate soil but it requires expensive equipment.

Vapor extraction is accomplished by drilling holes and inserting perforated pipes into the soil. The piping is connected to a pump that sucks out the contamination. The extracted vapors may then be filtered or burned. However, this method requires a great deal of time, especially for heavy contamination in clay soils.

Bioremediation involves the use of bacteria to "eat" the contaminants. But, as with vapor extraction and aeration, it requires long periods of time to remove the contaminants.

Thermal conveyor devices have also been used to decontaminate soil. Prior thermal conveyor devices have used infra-red heat to incinerate the contaminants or to volatilize them so they may be filtered. Thermal conveyor devices which incinerate the contaminants in the same chamber where the soil is being transported require a means for moving soil which will withstand extreme temperatures. The useful life of the equipment is very limited under the conditions which expose it to moisture, fine particulate matter and the extreme heat necessary to burn the contaminants.

The use of filters is a common way to collect volatilized contaminants, but it is expensive. Filters must be periodically replaced or rejuvenated and while the filters collect the contaminants, the contaminants still must be disposed of.

The present invention comprises an improved thermal soil decontamination method and apparatus. The system comprises an infra-red heat source for volatilizing contaminants in the soil. The soil is conveyed to the heat source and air is directed across the soil for removing the volatilized contaminants. The volatilized contaminants are then directed through an internal combustion engine where they may be burned. With the present invention, contaminants may be quickly removed from the soil with relatively inexpensive equipment.

DETAILED DESCRIPTION OF THE PREFERRED EMBODIMENTS

Figure 1:
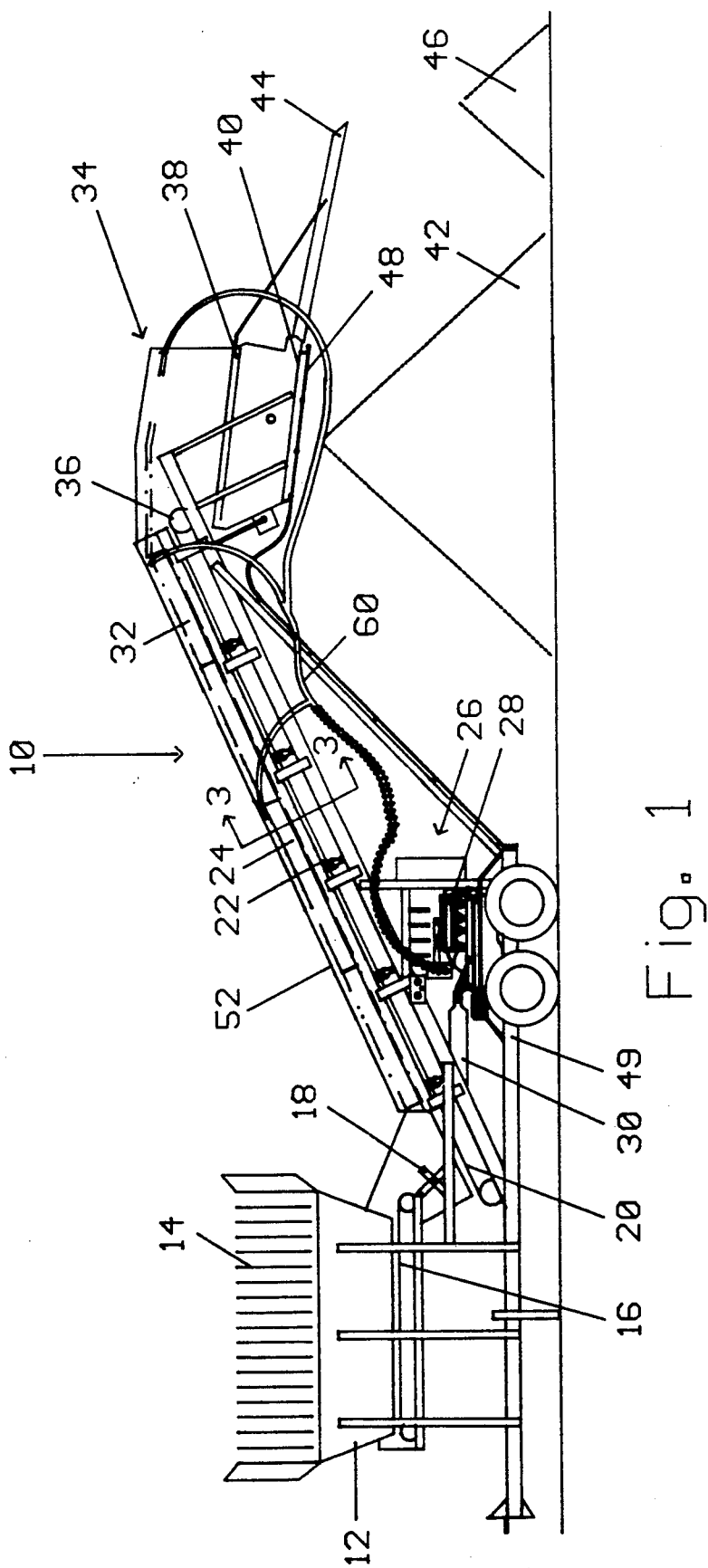
FIG. 1 is a schematic elevational view of an improved soil decontamination apparatus constructed in accordance with the present invention.
Figure 2:
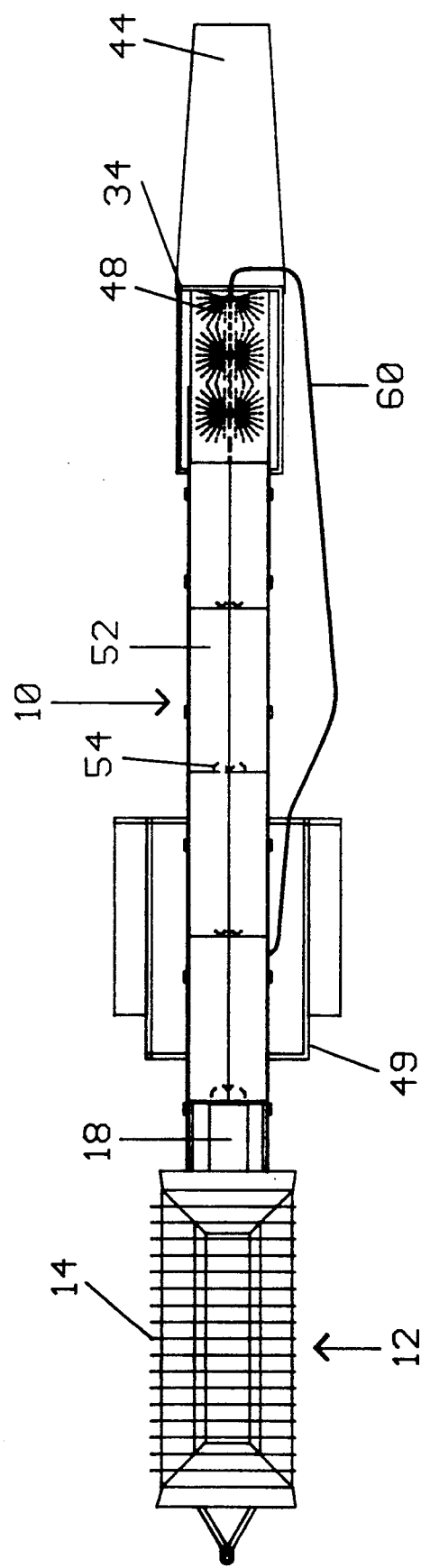
FIG. 2 is a schematic plan view of the apparatus of FIG. 1.

Referring to the drawings in detail, in particular to FIGS. 1 and 2, the present invention comprises an improved soil decontamination apparatus designated generally by the reference numeral 10. The decontamination apparatus 10 includes a soil receiving bin 12 for receiving contaminated soil. A grizzly 14 is secured on top of the bin 12 to prevent large clumps of soil and rock from entering the bin 12. A hopper conveyor 16 feeds contaminated soil into a hammer mill 18 where clumps of soil are broken down into small particles of soil. The small particles of soil then fall onto the first end 20 of a variable speed conveyor belt 22. The conveyor belt 22 carries the soil up through a heat chamber 24 where the contaminants are volatilized and removed.

The volatilized contaminants are directed from the heat chamber 24 to a vapor extraction system 26 such as a BACT 1 which is commercially available from VR Systems, Inc. of Anaheim, Calif. The vapor extraction system 26 should include a computer controlled internal combustion engine 28 so that the contaminants may be burned as fuel. With a vapor extraction system 26 of this type, the contaminants may be supplemented with conventional fuel so the engine 28 will run at a constant rate even though the amount of contaminant recovered may vary.

The vapor extraction system 26 may also include a catalytic converter 30 to purify the exhaust from the internal combustion engine 28. In addition the exhaust may be directed into the heat chamber 24 to provide additional heat for volatilizing contaminants.

The power provided by the internal combustion engine 28 may be used to power the conveyor belt 22. This may be accomplished by using the internal combustion engine 28 to drive a hydraulic pump and motor (not shown) which in turn drive the conveyor belt 22. The internal combustion engine 28 may also drive a generator to provide electricity which may be utilized to prefire infra-red heaters 32 or by lights to enable night operation. Soil exits the heat chamber 24 at end 34. The soil falls from the second end 36 of the conveyor belt 22 and comes in contact with sieves 38 and 40. The sieves 38 and 40 are sized to allow small particles of soil, preferably less than ¼ inch in diameter, to pass there through and onto clean pile 42. Larger particles of soil are diverted by the sieves and slide down chute 44 to an oversize pile 46. Soil in the oversize pile 46 may be recycled to further break down the particle size. Soil in the clean pile 42 should be monitored to ensure sufficient contaminant removal. If the soil in clean pile 42 contains an unacceptable level of residual contaminants then it may also be recycled. However, an unacceptable level of contaminants in the clean pile 42 may generally be eliminated by slowing down the conveyor belt 22 or increasing the temperature in the heat chamber 24.

A hydro-dust inhibitor/bioremediation spray system 48 may also be included. This system will be described in more detail below.

A soil pulverizing unit with the soil receiving bin 12, the grizzly 14, the hammer mill 18, the conveyor belt 22 and sieves 38 and 40 mounted on a movable frame 49 and without the incorporation of decontamination equipment such as the heat chamber 24, vapor extraction system 26 or spray system 48 may be purchased as a complete unit such as a made by Ohio Central Steel Company in Reynoldsburg, Ohio.

Figure 4:
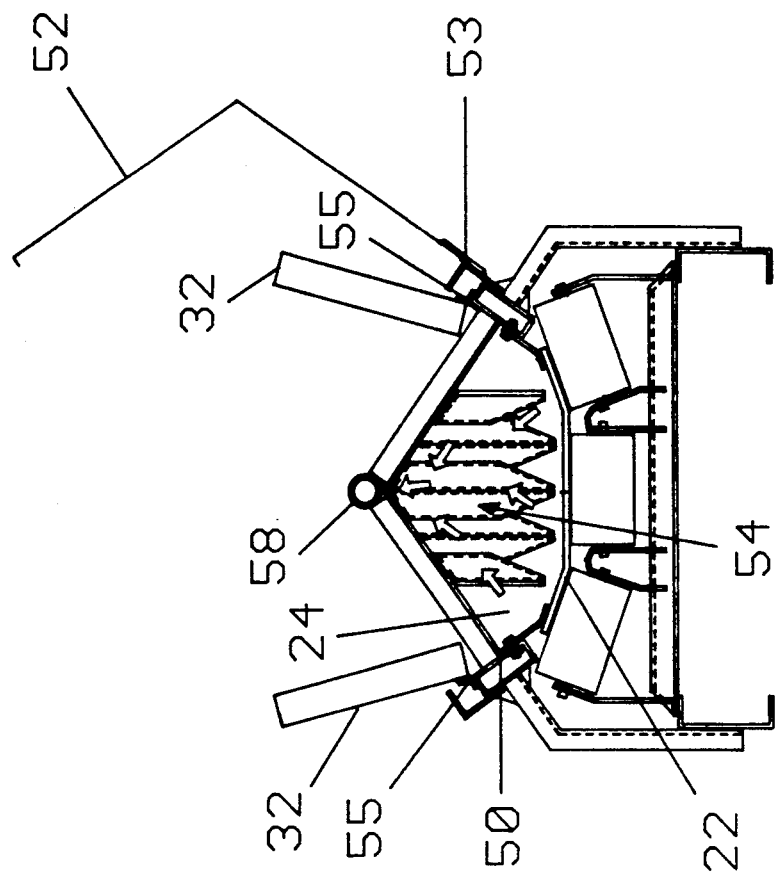
FIG. 4 is another schematic sectional view of the apparatus of FIG. 1 taken along lines 3—3 showing the heat chamber hood open and the infra-red heaters open.
Figure 3:
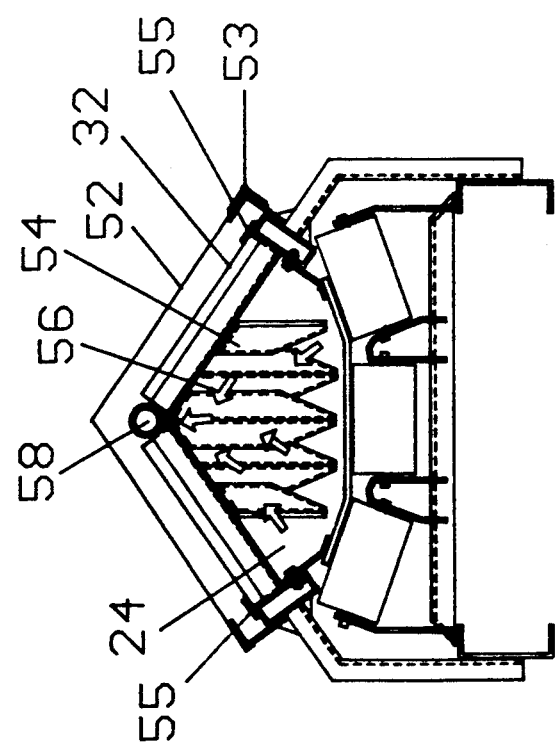
FIG. 3 is a schematic sectional view of the apparatus of FIG. 1 taken along lines 3—3 of FIG. 1.
Figure 5:
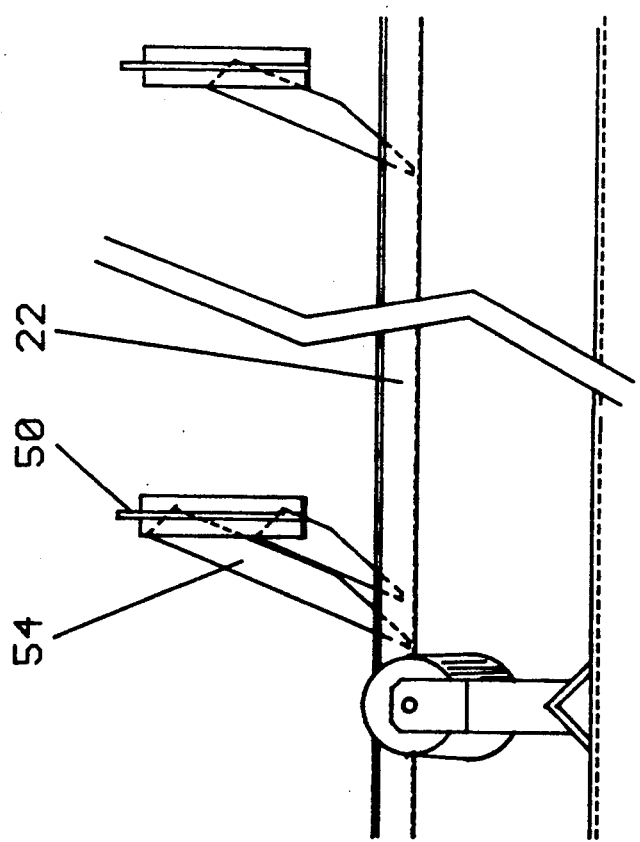
FIG. 5 is an enlarged schematic elevational view of part of the apparatus of FIG. 1 showing soil sweeps.

Referring now to FIGS. 3, 4 and 5, the heat chamber 24 comprises a frame 50 covered by a hood 52. The hood 52 is made of several sections connected to frame 50 by hinges 53. In this way, sections of the hood 52 may be pivoted up to provide access to the infra-red heaters 32 which are also secured in the heat chamber 24 to frame 50. The infra-red heaters 32 are also hingedly connected to frame 50 by hinges 55 so as to provide access to the interior of the heat chamber 24.

The infra-red heaters 32 are preferably flameless gas fired heaters emitting far infra-red radiation, that is, radiation with a wave length of greater than two microns and most preferably, radiation with a wave length generally greater than four microns. The far infra-red radiation is believed to be absorbed by the soil more readily than near infra-red radiation. In this way a lower temperature may be used to volatilize the contaminants. The heaters may be thermostatically controlled so that the risk of combustion of the vaporized contaminants in the heat chamber may be substantially eliminated.

Preferably sets of soil sweeps 54 are secured within the heat chamber 24 to the frame 50 directly above the conveyor belt 22. The soil sweeps 54 are mounted in sets (FIG. 5) and the sweeps 54 are offset to provide stirring of the soil as it moves through the heat chamber 24. Several sets of sweeps 54 should be mounted along the frame 50. In this way the soil is evenly heated as it passes through the heat chamber 24 and contaminants may be efficiently volatilized.

A stream of air is pulled through the heat chamber 24 as represented by arrows 56. The air stream carries the volatilized contaminants with it as it enters perforations in a central vapor duct 58. The vapor duct 58 directs the mixture of air and volatilized contaminants to conduits 60 (FIG. 1) and on to the vapor extraction system 26.

Figure 6:
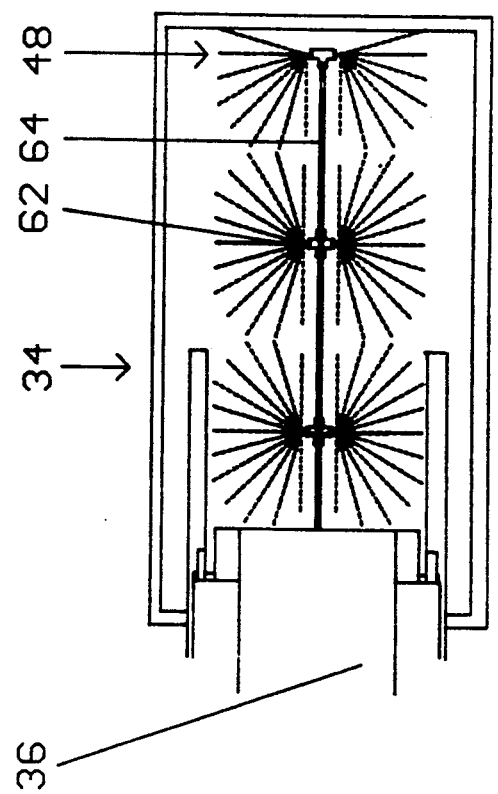
FIG. 6 is an enlarged schematic plan view of part of the apparatus of FIG. 1 showing a hydro-dust and biodegradation spray system.

Now referring to FIG. 6, as discussed before, the apparatus may have a hydro-dust inhibiting/biodegradation spray system 48 with nozzles 62 and conduits 64. The conduits 64 direct fluid from a supply (not shown) to the nozzles 62. The spray nozzles are preferably secured below sieve 40 so liquid may be added to the soil as it falls into clean pile 42. In this way, dust may be reduced and the moisture content of clean pile 42 may be regulated for optimum recompaction. Thus, soil from clean pile 42 may be recompacted without further processing. Bacteria may also be added to the soil by adding the bacteria to the liquid which is sprayed through nozzles 62. In this way the bacteria may "eat" any residual contaminants not removed in the heat chamber 24.

A fire control system may also be included as a safety feature to extinguish any rapid oxidation of the contaminants in the heat chamber. Fire control systems are common in the art and need not be described herein.

It will be appreciated that the present invention provides a soil decontamination device which is inexpensive to manufacture and easily transported from one location to another.

Changes may be made in the construction, operation and arrangement of the various parts, elements, steps and procedures described herein without departing from the spirit and scope of the invention as defined in the following claims.

What is claimed is:

1. A soil decontamination apparatus comprising:
   means for breaking down clumps of contaminated soil;
   a heat chamber;
   conveyor means for transporting the contaminated soil from the means for breaking down clumps of soil through the heat chamber;
   a plurality of heaters secured within the heat chamber for heating the soil to a temperature sufficient to volatilize contaminants in the soil without combusting the contaminants; and
   a vapor extraction system communicating with the heat chamber for drawing volatilized contaminants from the heat chamber and burning the contaminants, wherein the vapor extraction system includes an internal combustion engine for burning the volatilized contaminants.

2. The apparatus of claim 1 wherein the heaters emit infra-red radiation and wherein a substantial portion of the infra-red radiation has a wave length of greater than 2 microns.

3. The apparatus of claim 1 wherein the heaters emit infra-red radiation and wherein the infra-red radiation has a wave length of generally 4 microns.

4. The apparatus of claim 1 wherein the heaters are gas fired infra-red heaters.

5. The apparatus of claim 1 wherein the vapor extraction system further comprises a catalytic converter for purifying the engine exhaust.

6. The apparatus of claim 1 wherein the engine is connected to and powers the conveyor.

7. The apparatus of claim 1 including a generator connected to and powered by the engine for producing electricity, and wherein at least a portion of the electricity is used to power the heaters.

8. The apparatus of claim 5 characterized further to include means for directing the engine exhaust toward contaminated soil to assist in volatilizing the contaminants.

9. The apparatus of claim 1 wherein the vapor extraction system includes a central duct running substantially the length of the heat chamber for gathering the volatilized contaminants.

10. The apparatus of claim 1 further comprising a hydro-dust inhibiting system secured to the heat chamber in a position to add liquid to the heated soil.

11. The apparatus of claim 1 further comprising soil sweeps secured in the heat chamber for stirring the soil as it passes through the heat chamber.

12. The apparatus of claim 1 further comprising a bio-remediation system secured to the heat chamber in a position to add liquid to the heated soil.

13. The apparatus of claim 4 including a generator connected to and powered by the engine for producing electricity, and wherein at least a portion of the electricity is used to pre-fire the heaters.

14. The apparatus of claim 13 wherein the heaters emit infra-red radiation and wherein a substantial portion of the infra-red radiation has a wave length of greater than 2 microns.

15. The apparatus of claim 13 wherein the heaters emit infra-red radiation and wherein the infra-red radiation has a wave length of generally 4 microns.

16. The apparatus of claim 13 wherein the heaters are gas fired infra-red heaters.

17. The apparatus of claim 13 wherein the vapor extraction system includes a catalytic converter for purifying the engine exhaust.

18. The apparatus of claim 13 wherein the engine is connected to and powers the conveyor.

19. The apparatus of claim 16 wherein the heaters utilize a generator connected to the engine.

20. The apparatus of claim 16 characterized further to include means for directing the engine exhaust toward contaminated soil to assist in volatilizing the contaminants.

21. The apparatus of claim 13 wherein the vapor extraction system includes a central duct running substantially the length of the heat chamber for gathering the volatilized contaminants.

22. The apparatus of claim 13 further comprising a hydro-dust inhibiting system secured to the heat chamber for adding liquid to the heated soil.

23. The apparatus of claim 13 further comprising soil sweeps secured in the heat chamber for stirring the soil as it passes through the heat chamber.

24. A soil decontamination apparatus comprising:
a heat chamber;
a conveyor means for transporting contaminated soil through the heat chamber;
a plurality of heaters secured to the heat chamber for heating the soil to a temperature sufficient to volatilize contaminants in the soil without combusting the contaminants;
a vapor extraction system communicating with the heat chamber for drawing volatilized contaminants from the heat chamber; and
a spray system secured to the heat chamber for adding a liquid which contains bacteria to the heated soil.

* * * * *

UNITED STATES PATENT AND TRADEMARK OFFICE
CERTIFICATE OF CORRECTION

PATENT NO.  : 5,199,212
DATED       : April 6, 1993
INVENTOR(S) : Bobby G. Newcomb It is certified that error appears in the above-identified patent and that said Letters Patent is hereby corrected as shown below:

Column 3, line 24, after "such as a", insert --PULVERIZER-II--.

Signed and Sealed this

Eleventh Day of January, 1994

Attest:

BRUCE LEHMAN

*Attesting Officer*  *Commissioner of Patents and Trademarks*